June 30, 1931.　　　W. BÄSELER　　　1,812,190

RAILWAY TRACK BRAKE

Original Filed Feb. 5, 1926　　2 Sheets-Sheet 1

Inventor:
Wolfgang Bäseler
by Keurhaus
Atty.

Patented June 30, 1931

UNITED STATES PATENT OFFICE

WOLFGANG BÄSELER, OF MUNICH, GERMANY

RAILWAY TRACK BRAKE

Application filed February 5, 1926, Serial No. 86,222, and in Germany February 9, 1925. Renewed May 19, 1930.

My invention relates to railway track brakes more especially of the stationary kind operated by electromagnetic means. Its primary objects are to provide efficient means for stopping cars and to improve and perfect stationary car brakes as hereinafter more fully described.

The railway track brakes serving to brake the wheels of railway cars by magnetic action as hitherto designed either have too low a braking power or do not allow a nice adjustment of the braking force. The track brake acording to the present invention is so designed as to obviate these drawbacks.

According to my experience, high braking effects can be obtained only if a high magnetic flux is forced across the rim of the wheel to be braked, in such manner that on the one side of the rim is formed the north pole, on the other side the south pole of the magnet, means being provided to allow the magnetic flux to close underneath the rails. I have found that the braking effect can be considerably increased by using pole shoes composed of a plurality of laminæ extending in the longitudinal direction. As a rule the braking effect of brakes operated by eddy current first rises with increasing velocity to a maximum value to slowly drop thereafter until at infinitely high velocity of the wheel the zero point is reached. The velocity at which the maximum braking effect is obtained is called critical velocity. The movement of the wheel rims relative to the pole shoes (braking bars) is composed of two parts, viz. rotation about the wheel axis and translation movement of the car. The rotary movement generates eddy currents in the wheel rims, the translation movement in the pole shoes. In view of this fact it would seem advisable to use solid pole shoes in order to obtain a maximum of eddy currents in these shoes and in consequence thereof the highest possible braking effect. I have now found that this assumption is not correct. If solid braking bars are used, the critical velocity is diminished to such an extent that the total braking effect is comparatively low. In contradistinction thereto, the use of laminated pole shoes (braking bars) has proved to result in a great increase of the total braking effect within the range of velocities arising in the switching of cars. Apart from this construction of the pole shoes or braking rails I have further found that with braking rails rigidly connected with the magnet the distance between the brake shoes and the magnet must be great enough to allow the widest wheel rims to pass through between them. In consequence of such arrangement a comparatively large air gap forms between the wheel rim and the magnet poles, which prevents the formation of a sufficiently high magnetic flux and causes the wheels to always apply themselves only to one shoe of a pair of pole shoes, thereby frequently causing a derailment.

It has already been suggested to arrange the pole shoes on arms adapted to rock about a common hinge pin so that on the magnet being energized the arms carrying the pole shoes will describe a circle about the hinge pin and will apply themselves against the car wheels. However this arrangement does not allow the pole shoes or braking rails to fully apply their braking surface to the rims of the wheels passing through between them. In contradistinction thereto I arrange the pole shoes or braking bars in such manner that they can move towards and away from each other with their braking surfaces in parallel to each other and to the wheels to be braked.

I further prefer providing additional means, besides the magnetic ones, for moving the braking bars.

In the drawings affixed to this specification and forming part thereof several modifications of an electromagnetic track brake embodying my invention are illustrated diagramatically by way of example. In the drawings Fig. 1 is an elevation, partly in section, of the simplest form, Fig. 2 is a similar view of a brake in which the legs of the magnet are hinged to the base and the shoes are hinged to the legs.

Figure 1:
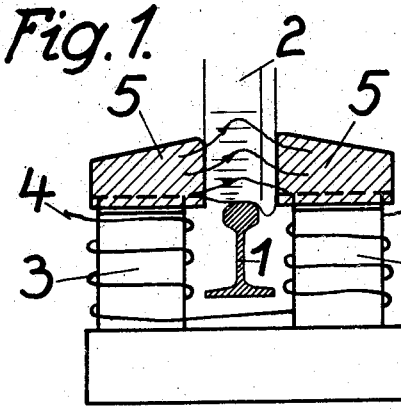

Referring first to Fig. 1, 1 is one of the track rails, 2 is the lower part of a car wheel resting on rail 1. 3, 3 are the vertical legs of a horseshoe magnet, 4, 4 are the electric windings surrounding these legs and 5, 5 are the pole shoes mounted on the legs 3 in such manner as to be capable of freely moving towards each other and towards the wheels which passes between them.

The magnets formed by the legs 3 and the windings 4 are strong enough to cause the entire magnetic flux to be closed underneath the rail 1. The formation of an air gap between the brake and the rim of wheel 2 is avoided by the brake shoes 5 being capable of moving bodily on the legs of the magnet in the direction towards the wheel so as to closely apply themselves against the wheel rim.

Figure 2:
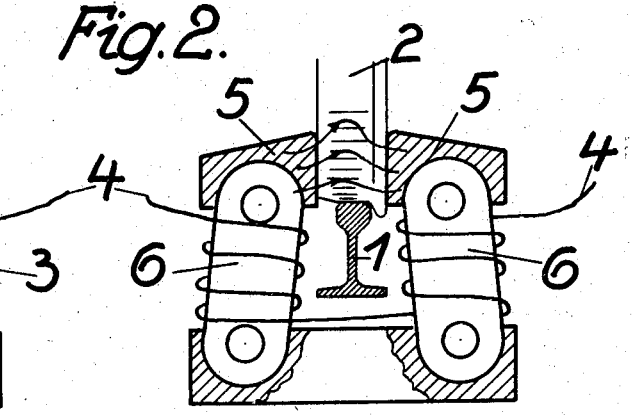

In the device illustrated in Fig. 2, the pole shoes 5, instead of being freely movable on the legs of the electromagnet, are hinged to the legs 6, these latter being hinged in turn to the base portion of the magnet so as to be able to rock on this base portion and thereby to allow the operative faces of the pole shoes to fully apply themselves against the rim of the wheel 2.

Figure 3:
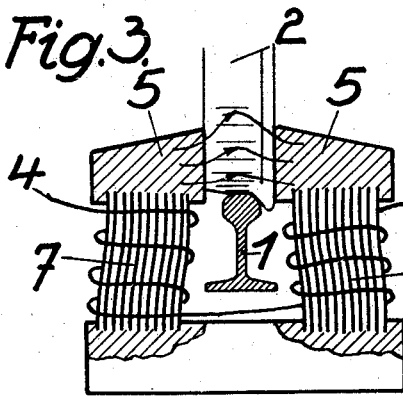
Fig. 3 is a similar view of a brake in which the legs of the magnet are laminated and capable of resilient deformation.

In the modification illustrated in Fig. 3 the pole shoes 5 are mounted on the upper ends of bundles of thin resilient laminæ 7 forming the legs of the magnet, which are thus rendered resilient in such manner as to allow the pole shoes 5 to move in the direction towards each other and towards the rim of the wheel 2.

Figure 4:
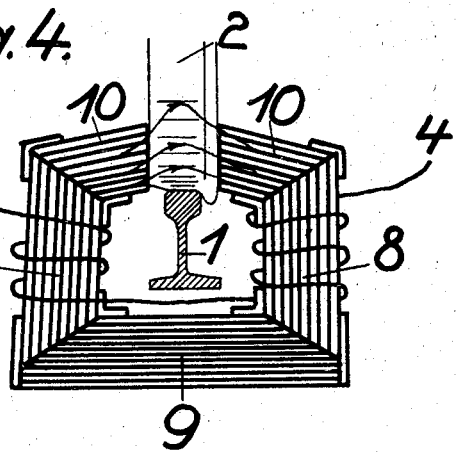
Fig. 4 is a front elevation of a brake which is composed throughout of laminæ capable of relative displacement.

In the brake illustrated in Fig. 4 the legs 8 of the magnet as well as its base piece 9 and the pole shoes 10 themselves are composed of laminæ capable of moving relatively to each other so as to allow the operative faces of the pole shoes 10 to apply themselves against the wheel 2. In a brake designed as shown in Fig. 4, the injurious influence of eddy currents is avoided also.

If it is desired to further increase the braking action, for instance if it is desired to brake entire trains, pistons 11, movable in hydraulic cylinders and acting on the pole shoes 5 or 10 can be provided, these pistons acting towards forcing the pole shoes against the wheels with an additional force which together with the magnetic flux causes the wheels to be reliably braked without allowing them to rise.

Figure 5:
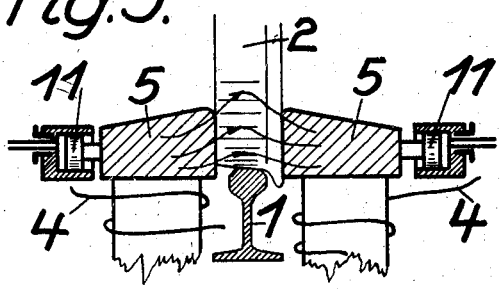
Fig. 5 is an elevation partly in section of the top part of a brake comprising movable pole shoes and hydraulic or pneumatic means for acting on these shoes in the direction of application.
Figure 6:
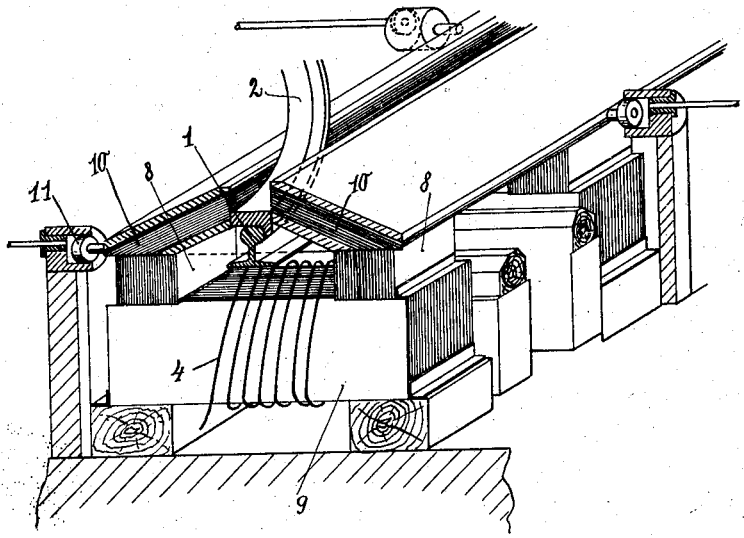
Fig. 6 is a perspective view of a braking structure using magnets and pole shoes or braking bars with the addition of hydraulic cylinders and pistons.

The braking device illustrated in Fig. 6 shows the general design of magnets and pole shoes or braking bars as disclosed in Fig. 4 with the addition of hydraulic cylinders and pistons as shown in Fig. 5.

I wish it to be understood that I do not desire to be limited to the exact details of construction shown and described for obvious modifications will occur to a person skilled in the art.

I claim:—

1. A railway brake comprising a U-shaped electromagnet located in the trackway with its legs on opposite sides of a rail, and pole shoes mounted on the upper ends of said legs to slide horizontally toward and away from each other and to engage the opposite sides of a wheel on said rail when the magnet is energized.

2. A railway brake comprising a U-shaped electromagnet located in the trackway with its legs on opposite sides of a rail, and pole shoes mounted on the upper ends of said legs to slide horizontally toward and away from each other and to engage the opposite sides of a wheel on said rail when the magnet is energized, said pole shoes being formed at least in part of laminations which are parallel to the rail.

3. A railway brake comprising a U-shaped electromagnet located in the trackway with its legs on opposite sides of a rail, and pole shoes mounted on the upper ends of said legs to slide horizontally toward and away from each other to engage the opposite sides of a wheel on said rail when the magnet is energized, each pole piece being inclined upwardly from its associated magnet leg toward the position occupied by a wheel on the rail.

4. A railway brake comprising a U-shaped electromagnet located in the trackway with its legs on opposite sides of a rail, and pole shoes mounted on the upper ends of said legs to slide horizontally toward and away from each other to engage the opposite sides of a wheel on said rail when the magnet is energized, each pole piece being formed at least in part of laminations which are parallel to the rail and are inclined upwardly from the associated magnet leg toward the position occupied by a wheel on the rail.

5. A railway brake comprising a U-shaped electromagnet located in the trackway with its legs on opposite sides of a rail, and pole shoes associated with the upper ends of said legs and formed at least in part of laminations which are parallel to the rail.

In testimony whereof I affix my signature.

WOLFGANG BÄSELER.